United States Patent
Dannenberg et al.

(10) Patent No.: US 8,424,130 B2
(45) Date of Patent: Apr. 23, 2013

(54) TOILET MONUMENT WITH RECEPTACLE FOR A MOBILE SANITARY UNIT

(75) Inventors: Andreas Dannenberg, Hamburg (DE); Christiane Lindauer, Hamburg (DE); Thomas Vogt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/300,051

(22) Filed: Nov. 18, 2011

(65) Prior Publication Data

US 2012/0060271 A1 Mar. 15, 2012

Related U.S. Application Data

(63) Continuation of application No. PCT/EP2010/056080, filed on May 5, 2010.

(60) Provisional application No. 61/179,472, filed on May 19, 2009.

(30) Foreign Application Priority Data

May 19, 2009 (DE) .......................... 10 2009 021 969

(51) Int. Cl.
*A47K 7/00* (2006.01)
(52) U.S. Cl.
USPC .................................................. 4/664; 4/316
(58) Field of Classification Search .............. 4/316, 321, 4/664, 449, 458, 464, 467, 476
See application file for complete search history.

(56) References Cited

U.S. PATENT DOCUMENTS

| 2,205,405 | A  | * | 6/1940  | Harm ................................ 4/467 |
| 6,637,049 | B2 | * | 10/2003 | Gallant ............................. 4/664 |
| 6,640,356 | B1 | * | 11/2003 | Hans ................................. 4/664 |
| 7,100,872 | B2 |   | 9/2006  | Quan |
| 7,118,677 | B2 |   | 10/2006 | Hoffjann et al. |
| 2005/0116099 | A1 | | 6/2005 | Pho et al. |
| 2008/0127411 | A1 | | 6/2008 | Hoffjann et al. |

FOREIGN PATENT DOCUMENTS

| DE | 4309050 A1    | 4/1995 |
| DE | 4409069 A1    | 9/1995 |
| DE | 10229799 A1   | 1/2004 |
| DE | 102006042300 A1 | 3/2008 |
| EP | 0074934 A2    | 3/1983 |
| EP | 1752589 A1    | 2/2007 |
| GB | 964971 A      | 7/1964 |

OTHER PUBLICATIONS

International Search Report dated Sep. 1, 2010 for International Application No. PCT/EP2010/056080.
German Patent Office, German Office Action dated Nov. 28, 2012 for German Patent Application No. 10 2009 021969.2.

* cited by examiner

*Primary Examiner* — Tuan N Nguyen
(74) *Attorney, Agent, or Firm* — Ingrassia Fisher & Lorenz P.C.

(57) ABSTRACT

A toilet monument is provided, in particular for a passenger transport vehicle, which includes, but is not limited to a receptacle that is configured to receive a mobile sanitary unit. The mobile sanitary unit includes, but is not limited to components for operating the sanitary unit. The mobile sanitary unit may be removed completely from the toilet monument in order to make it possible to affect decentralized cleaning and servicing of the mobile sanitary unit. The term mobile sanitary unit refers, for example, to a toilet unit, a hand wash facility, a urinal or a shower unit.

16 Claims, 5 Drawing Sheets

TOILET MONUMENT WITH RECEPTACLE FOR A MOBILE SANITARY UNIT

CROSS-REFERENCE TO RELATED APPLICATIONS

The present application is a continuation of International application No. of PCT/EP2010/056080 filed May 5, 2010, which was published under PCT Article 21(2) and which claims the priority of the U.S.-Provisional application No. 61/179,472, filed on May 19, 2009 and of the German application No. 10 2009 021 969.2, filed on May 19, 2009, the disclosure of which applications are hereby incorporated herein in their entirety by reference.

TECHNICAL FIELD

The technical field relates to a toilet monument for a passenger transport vehicle, in particular to a toilet monument with a sanitary unit that is easy to service and clean.

BACKGROUND

In the field of passenger transport, for example in the case of aircraft, railways, or motor vehicles, the comfort of passengers is considerably improved if sanitary units, for example toilets, are provided. In aviation it forms part of the state of the art to arrange at least one central device for drainage, for example a so-called drain mast, in order to be able, during the flight, to centrally drain to the outside of the aircraft the gray water arising from the use of hand basins. Moreover, it is common practice to arrange a central fresh-water system, for example in order to supply basins, toilets or other consumers of water, for example the galley.

From DE 102 29 799 A1, for example, a central fresh-water/waste-water system is known in which a central gray-water system is provided which may either be drained by way of a central drain mast or, after a treatment stage, may be reused for flushing toilets.

Furthermore, from GB 964,971 a toilet unit, in particular for aircraft, is known. The waste water is reused in a so-called recirculation system. In this manner the water arising from the toilet may be filtered and re-used for flushing the toilet. The above-mentioned toilet unit may either be serviced on board the aircraft, or may be removed from the aircraft for servicing.

SUMMARY

A toilet monument is provided that is easy to service and to clean.

According to an embodiment, a toilet monument is provided that comprises a receptacle, a mobile sanitary unit, a first opening and a second opening. In this arrangement the receptacle is designed to receive the mobile sanitary unit, which comprises all the components necessary for operation of the sanitary unit. Furthermore, the toilet monument comprises a first opening for gaining access to the toilet monument, and a second opening, which differs from the first opening, for putting the mobile sanitary unit into place or for removing it.

All the components required for operation relate, in particular, to the inflow or outflow of liquid to or from the sanitary unit, which flow may, for example, take place autonomously as a circular flow. The components comprise, for example, a collecting tank for arising used water, as well as supply lines, pumps, filters, valves, pipes and electronics. If the sanitary unit requires a fresh-water tank, as is, for example, required in the case of a hand wash facility, this component also forms part of the components necessary for operation. In contrast to this, toilet units with a recirculation solution do not require a fresh-water tank for autonomous operation, but in this case the use of chemicals is required for operation. An electricity supply may be provided from externally and/or internally. An internal accumulator may serve as an internal electricity supply, for example as an emergency power supply.

Based on the arrangement of the toilet monument, maintenance personnel on the ground may easily put in place and remove the mobile sanitary unit, and may thus ensure simple and hygienic handling. Any technical problems may then be solved in a decentralized manner in suitable workshops outside the passenger transport vehicle. Such a mobile sanitary unit is self-contained and may be cleaned, emptied, filled and serviced in a decentralized manner. A decentralized cleaning and servicing solution of the sanitary units that are inserted in toilet monuments is thus associated with considerable cost savings.

The bulky toilet monument itself may remain in the means of transport and need not be dismantled in a costly manner. The first opening, which is designed as a door opening, may thus be designed so as to be relatively narrow so that a person may enter the toilet monument. In the above-mentioned first opening of the toilet monument a lockable toilet door may be arranged, which is designed either as a hingeable solid element or as a space-saving folding door.

A second opening of the toilet monument is designed in such a manner that it may receive a mobile sanitary unit in an ideal manner, in other words, for example, is guided by the height and width of this unit. This second opening for receiving the mobile sanitary unit may be arranged on a sidewall of the toilet monument so that the mobile sanitary unit may simply be moved out to an adjacent door entrance region. During the time of travel the sanitary unit is securely coupled to the toilet monument and may be released, for example, only by qualified personnel. Releasing and unlocking the mobile sanitary unit from the toilet monument may, as a rule, be carried out during the downtimes of the means of transport. The term "mobile sanitary unit" refers, for example, to a toilet unit, a hand wash facility, a urinal, a shower unit or a tub unit.

Toilet monuments that are not positioned beside an entrance, but instead between the seat rows, may be transported out of the means of transport, for example by way of an opening arranged on the front wall, along the aisle and subsequently through a passenger door. As a result of the possibility of external servicing of the mobile sanitary units the standard servicing intervals during the downtimes of the means of transport are significantly shortened or avoided. Mobile sanitary units that have already undergone disinfection and that are provided so as to be ready for use may immediately be installed in the toilet monument, and the used sanitary units are delivered for disinfection, servicing or repair.

Based on the mobile sanitary units that may be used in a modular manner, it is possible to take into account special customer wishes. For example, a recirculation toilet unit may be replaced by a negative pressure system equipped with a flush-water tank. In particular in the case of aircraft, depending on the planned duration of the flight and thus on different requirements for saving weight, it is possible to select between a waterless recirculation toilet unit and a flush-water solution.

According to a further embodiment, the toilet monument comprises a mobile sanitary unit that has a housing with an odor-sealing and/or a liquid-sealing cover.

In this manner it is possible to provide an odor seal or water seal that prevents passengers or service personnel from being exposed to escaping odors or liquids during changeover. In particular in the case of a sanitary unit in the form of a toilet unit a reliably functioning odor seal is important. A liquids seal is used to ensure that, in particular during handling and transporting the mobile sanitary unit, any escaping of liquids or residual liquids is excluded. In the closed position of the cover it is important that the openings of the housing may be closed off so as to provide a completely tight seal against the cover. This may, for example, be achieved by way of a screwing device or a clamping device.

While the sealing device may be limited solely to the liquid-carrying devices, the cover may extend all the way to the sidewalls of the mobile sanitary unit in order to visually close off the sanitary unit. In this manner the function of the mobile sanitary unit is not evident from the outside. The cover is, for example, hingeably attached to the housing of the mobile sanitary unit. On the other hand, the cover may also be slidably arranged.

According to an embodiment, the mobile sanitary unit of the toilet monument comprises a rolling device or a sliding device.

Rolling elements or sliding elements may facilitate displacement, and thus transport, of the mobile sanitary unit. To this effect, for example, drum-type rollers, ball rollers, studs, rails or skids are suitable. If rails are used that are already present and installed in the floor of the motor vehicle or passenger vehicle, the mobile sanitary unit may be equipped with corresponding rail track systems and suitable studs. In this manner the sanitary unit may easily be transported, and may be transported to spaces outside the means of transport, which spaces make it possible to effect quick, simple and hygienic cleaning. For safe transport not only roller devices but also suitable braking devices or stopping devices may be provided to prevent uncontrolled rolling away.

Furthermore, it is possible to design the rollers or skids in such a manner that when inserted into the receiving openings of the toilet monument they fold in. Sliding on rails installed in the toilet monument may in turn be supported by suitable rails affixed to the mobile sanitary unit so that the rollers are used only for transport and are no longer used in the toilet monument. Furthermore, handles affixed to the housing ensure easy handling for transport, insertion or removal from the toilet monument. In this way it is possible to ensure in a simple manner decentralized disposal of the waste-water arising in the mobile sanitary unit, as well as disinfection of the entire unit.

For handling it is particularly important to provide good mobility and an airtight and liquid-tight seal of the mobile sanitary unit. A display visible from the outside is to inform service personnel or on-board personnel as to the fill levels which the relevant liquids containers or waste containers of the sanitary unit have reached. For example, in the case of a toilet unit the fill-level indicator indicating the level in the waste-water filling tank would be decisive. The completely filled toilet unit may then be transported for servicing by way of the passenger door and subsequently by way of a corresponding conveying device. It is only in the corresponding disposal chambers or cleaning chambers that opening the system takes place, which opening may also take place automatically.

According to an embodiment, the second opening of the toilet monument may be closed off by a sidewall of the mobile sanitary unit.

In this way it is possible to save space and weight because the sidewall of the toilet monument as a permanent item of equipment together with the mobile sanitary unit in its slid-in state may form a wall unit. In this arrangement the sidewall of the housing of the mobile sanitary unit may be secured on the toilet monument. The connecting devices described below may also assume the function of locking into place a sidewall of the housing of the mobile sanitary unit so that a tight connection between the components of the toilet monument and the mobile sanitary unit may be established.

According to an embodiment, the toilet monument comprises a connecting device for secure and function-coupling connection of the mobile sanitary unit in the receptacle.

In this manner the mobile sanitary unit may be affixed in the toilet monument in order to safeguard it against any uncontrolled or undesirable change in position. In particular in aircraft applications, vibrations or turbulence may result in displacement. This may be prevented by suitable securing locking mechanisms, for example, snap hooks/bayonet devices. Furthermore, connection to any existing seat rails in the cabin floor is also possible.

The connecting device may also be designed as a mechanical quick-action locking device. In this manner the mobile sanitary unit may easily be clicked into place but it may no longer be undone without manual intervention. If the connecting device is, for example, a rail, by snapping into the rail it is also possible for an electrical contact to be established, and thus for locking of the sanitary unit to be displayed centrally by way of the on-board system. By electrical coupling it is also possible to switch a central release device, so that only authorized personnel may disconnect the sanitary unit from the connecting device. For example, personnel may cause unlocking of the sanitary unit by way of the flight attendant panel (FAP) device. In addition to electronic components, unlocking should be carried out manually in order to meet the safety regulations applying to passenger transport vehicles.

According to an embodiment, the mobile sanitary unit comprises an interface to the external electricity supply. The electricity is transmitted inductively.

This means that irrespective of the fact that the mobile sanitary unit comprises all the components required for operation, the toilet monument or the mobile sanitary unit comprises an interface by way of which the electrical units of the mobile sanitary unit may also obtain the electricity from an external source. However, an internal electricity supply, for example with the use of a battery, may continue to supply the mobile sanitary unit in the case of power outages. By inductive current transmission, the use of cables or plug-type connections may be avoided.

According to an embodiment, the mobile sanitary unit comprises a sensor arrangement for outputting measured data that may be transmitted by way of a wireless interface.

The mobile sanitary unit may comprise fill-level measuring devices and a corresponding sensor arrangement in order to detect which water levels in the fresh-water tank or in the waste-water tank have been reached. Once the maximum or minimum fill levels have been reached a central position in the passenger vehicle may be informed of this. Thus, after release by the cabin crew, which checks that no passengers are still in the toilet monument, locking of the mobile sanitary unit or of the entire toilet monument may be caused by way of an automatic door lock system, and at the next opportunity exchange of the sanitary unit may be arranged.

Measured data relevant to operation may be transmitted to the cabin communication system by way of a wireless interface. For those cases where there is no electricity supply to the mobile sanitary unit, for example as is possible after separation from the function-coupling receptacle, currentless fill-level indicators or status displays suggest themselves, which make it possible to recognize from the outside whether or not the mobile sanitary unit requires servicing. A processor, provided in the electronics unit, with an integrated storage unit may provide, to the service personnel, data, for example relating to runtimes of the pumps or filters.

According to a further embodiment, the toilet monument or the mobile sanitary unit comprises a connection device for connection to a central waste-water system.

In this manner it is possible, for example, to drain arising quantities of gray water towards the outside by way of a central drain mast. This is possible in particular in aircraft, because weight may be saved in this manner. If a central waste-water discharge system, for example a vacuum waste-water system, is arranged in an aircraft, in this manner the output of the pumps may be utilized centrally, and thus energy may be saved. As a result of the built-up vacuum, solid human waste may be sucked from the toilet bowl and may be conveyed into the collecting tank. While black water may continue to be collected in containers, in contrast to this, gray water may be drained overboard by way of the drain mast so as to save weight.

According to a further embodiment, the cover of the mobile sanitary unit is designed as a roller cover.

In this manner it is again possible to save space, because there is no need to provide in the toilet monument either a hinging device for hinging a cover, or an attachment device for the hinged-out cover. The roller cover may be designed in such a manner that it may be rolled up behind a wall of the housing. Furthermore, it is possible to accommodate the roller cover in a suitable receiving device of a toilet monument wall. This may take place in the rolled-up state or in the pushed-together state. The cover may be mechanically coupled in such a manner that when it is removed, the sanitary unit automatically closes.

According to a further embodiment, the toilet monument comprises a mobile sanitary unit in the form of a toilet unit. The toilet unit comprises a toilet bowl, a collecting container for solid human waste and waste water, and a container for receiving operating units.

An electronics device with a control system and a sensor arrangement are examples of operating units. Furthermore, a toilet unit comprises suitable pumps, filters, valves, as well as inlet and outlet pipes. In this manner a compact toilet setup may be provided, the disposal of which may take place in a decentralized manner. If a flush-water tank is added to this toilet unit it is possible to do away with the equipment relating to recirculation, and the associated equipment relating to filtering and conveying. In relation to the flush-water solution, too, the housing of the toilet unit comprises the necessary valves and pipes that may interconnect the individual components.

Furthermore, the toilet unit may comprise a toilet lid that may be closed with an odor-tight seal. Moreover, it is possible to design the housing of the mobile toilet unit with devices for receiving sanitary articles, for example toilet paper. Thus a roll of toilet paper may be inserted by way of a flap arranged in the container wall and may be pulled out by a user through a slot arranged in the sidewall.

According to an exemplary embodiment, the mobile toilet unit comprises a connection device for connection to a central air extraction system.

The central air extraction system comprises a central ventilation or air exhaust device. With this central ventilation of the means of transport it is possible to prevent the occurrence of offensive smells because the air arising in the toilet unit may be immediately removed by suction.

According to a further embodiment, the toilet monument comprises a third opening, which differs from the first opening and the second opening, for receiving a further mobile sanitary unit in the form of a hand wash facility.

In this manner an independent hand wash facility may be inserted into the toilet monument or removed from it. The hand wash facility, as is the case in a flush-water solution in a toilet unit, comprises a fresh-water tank and a waste-water tank. Again, as is the case with the toilet unit, a container for electronics and further components necessary for operation may be provided. The housing of the mobile hand wash facility may also be used as a waste container or a container for receiving cleaning wipes and the like. The cover of the housing of the mobile wash facility may optionally also be dividable, and apart from the basin may provide further facilities, for example a fold-out baby's changing table that may easily be folded out by passengers when required.

According to a further embodiment, the toilet monument comprises a third opening, which differs from the first opening and the second opening, for receiving a further mobile sanitary unit in the form of a shower unit.

In this manner passenger comfort may be improved because there is now an option for passengers to have a shower or a bath. Depending on the available space, these wash facilities may be designed as a sit-down shower or a bathtub. However, with this embodiment it may be beneficial to provide a connection to the central water supply because presumably larger quantities of water are required. Likewise, connection to the central waste-water system, such as the drain mast, is possible because the quantities of water arising as gray water may immediately be drained to the outside. For servicing, the shower units or tub units may then be transported to the outside through the passenger door, as is the case with the above-mentioned mobile sanitary units.

According to a further embodiment, the toilet monument comprises a third opening, which differs from the first opening and the second opening, for receiving a further mobile sanitary unit in the form of a urinal.

In this manner, a toilet unit in the form of a sit-down toilet with a further toilet unit in the form of a urinal may be combined in a toilet monument.

Furthermore, the toilet monument may be used in an aircraft.

A toilet monument for aircraft, which toilet monument comprises at least one receptacle for a mobile sanitary unit, makes it possible to take into account customer-specific wishes, and as a result of decentralized cleaning of the mobile sanitary units makes it possible to save time and costs.

Furthermore, it should be pointed out that the above features may also be combined. Combining the above features may result in interactive effects and results that exceed the individual effects of the corresponding characteristics, even if this is not expressly described in detail.

Below, embodiments are described with reference to the following drawings.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

On board passenger transport vehicles, sanitary units for the supply of water and the disposal of water are predominantly permanently arranged in so-called monuments, for example in a toilet monument. These large monuments may only be completely de-installed with considerable expenditure of time and money, because, as a rule, after construction they no longer fit through the door openings of the passenger transport vehicle. For this reason it is necessary to provide independent and compact mobile sanitary units that for cleaning or servicing purposes may easily be removed from a toilet monument.

Sanitary units on board passenger transport vehicles, for example hand basins, toilets or shower cabins, require central servicing and regular disinfection. Such servicing may only take place during downtimes of the passenger transport vehicle, in special service centers, and as a rule is time-consuming and cost-intensive.

Below, the toilet monument is described with reference to exemplary embodiments for use in an aircraft. In a manner that is representative of mobile sanitary units, the following figures show a toilet unit and a hand wash facility.

Figure 1:
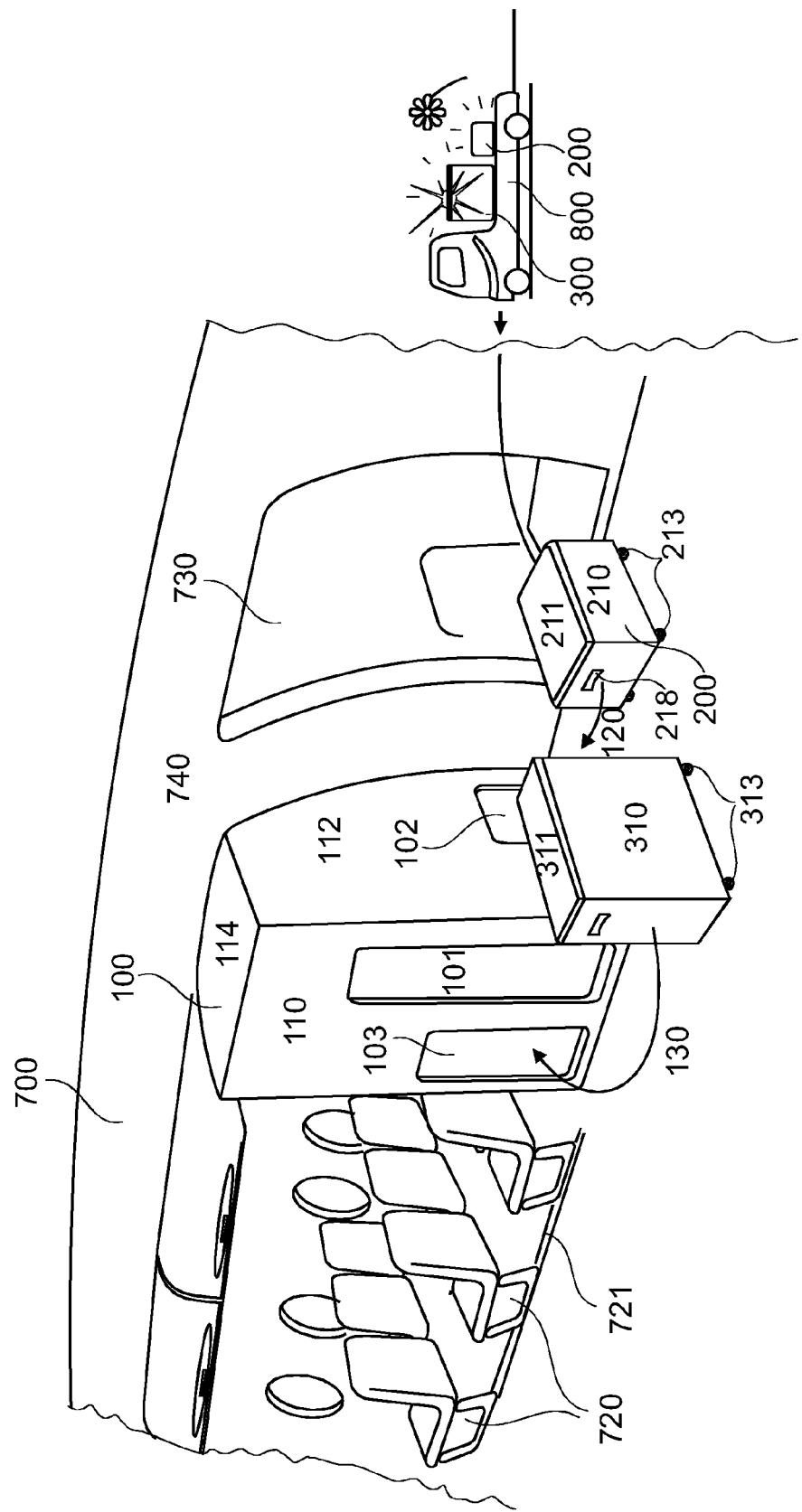
FIG. 1 is a lateral view of an on-board toilet monument with openings for receiving two mobile sanitary units.

FIG. 1 shows a three-dimensional lateral view of a toilet monument 100 of an aircraft 700. The toilet monument 100 is arranged between seat rows 720 and a door region of the entrance door or passenger door 730. Only a section of the aircraft interior is shown; the toilet monument 100 is connected to the aircraft structure, for example, by rails 721 that are also used for other items of aircraft interior equipment, for example passenger seats 720. Furthermore, the toilet monument comprises fixed sidewalls 110, 112 and a ceiling section 114 that finishes off approximately at the height of the top of the hat racks. In this arrangement the rear wall of the toilet monument may be formed by the aircraft interior wall 740. For connection to the aircraft structure the toilet monument requires on the one hand connections on the floor, such as seat rails or other similar attachments to affixation points (neither of them shown), and on the other hand optional tension rods that may be attached to the ceiling section 114 on the internal wall of the aircraft cabin 740.

In a further embodiment the toilet monument may also be constructed as a closed cabin which apart from the sidewalls and the ceiling section 114 comprises a rear wall and a ceiling element (not shown). In both embodiments the toilet monument comprises a toilet door 111 (compare FIG. 2) that may be received in the opening 101 either as a solid element or as a folding door. In addition, the fixed sidewalls (e.g., aisle wall) 110 comprises a further opening 103 that in the example shown may receive a hand wash facility 300. After insertion in the receptacle, a suitable wall element may be placed into the opening 103, which wall element may be locked into place. The elements for closing may, for example, be located in the sidewall and may be moved down when required. A further space-saving and weight-saving option of closing off the toilet element is using the sidewalls of the mobile sanitary units themselves as closing elements of the openings 102 and 103 of the toilet element.

The sidewall 112 comprises an opening 102 that is suitable to receive a toilet unit 200 as a mobile sanitary unit. In the example shown, the toilet monument 100 is not aligned so as to be flush with the cabin floor; instead it comprises a further interior floor, a so-called floor tray, which comprises structural surfaces and is formed to carry people. In this manner simple cleaning of the toilet monument 100 may be achieved. This results in a threshold height at the openings 102 and 103 of the toilet monument. In order to make it possible to easily move the mobile sanitary units into the plane of the toilet monument, wedges or extendable rail devices may be beneficial. As an alternative, the mobile sanitary units may also be lifted manually to the correct height and may subsequently be inserted into the opening or receptacle. In a further variant (not shown) the floor tray of the toilet monument may be designed in such a manner that there are no thresholds at the openings 102 and 103 and that the modules are easily retractable. In this embodiment the floor tray may comprise a floor surface with recesses for the mobile sanitary modules.

In FIG. 1 the action of sliding-in is shown by the arrow 130 in relation to the mobile hand wash facility 300, and by the arrow 120 in relation to the mobile toilet unit 200. Possibly, the rollers or skids affixed to the mobile sanitary units may be attached in such a manner that the lower surfaces of the housing may rest ideally against the lower edge of the opening 102 or 103. In this case the rollers 213 could be folded in during the slide-in process, and attachment to the toilet monument could be accomplished by a rail system affixed to the housing. This rail system may be arranged either on the underside of the housing or on the rear of the housing.

Furthermore, FIG. 1 shows a transport vehicle 800 that delivers already serviced or freshly filled and cleaned sanitary units 200 or 300 to the entrance region of the aircraft 700.

Figure 2:
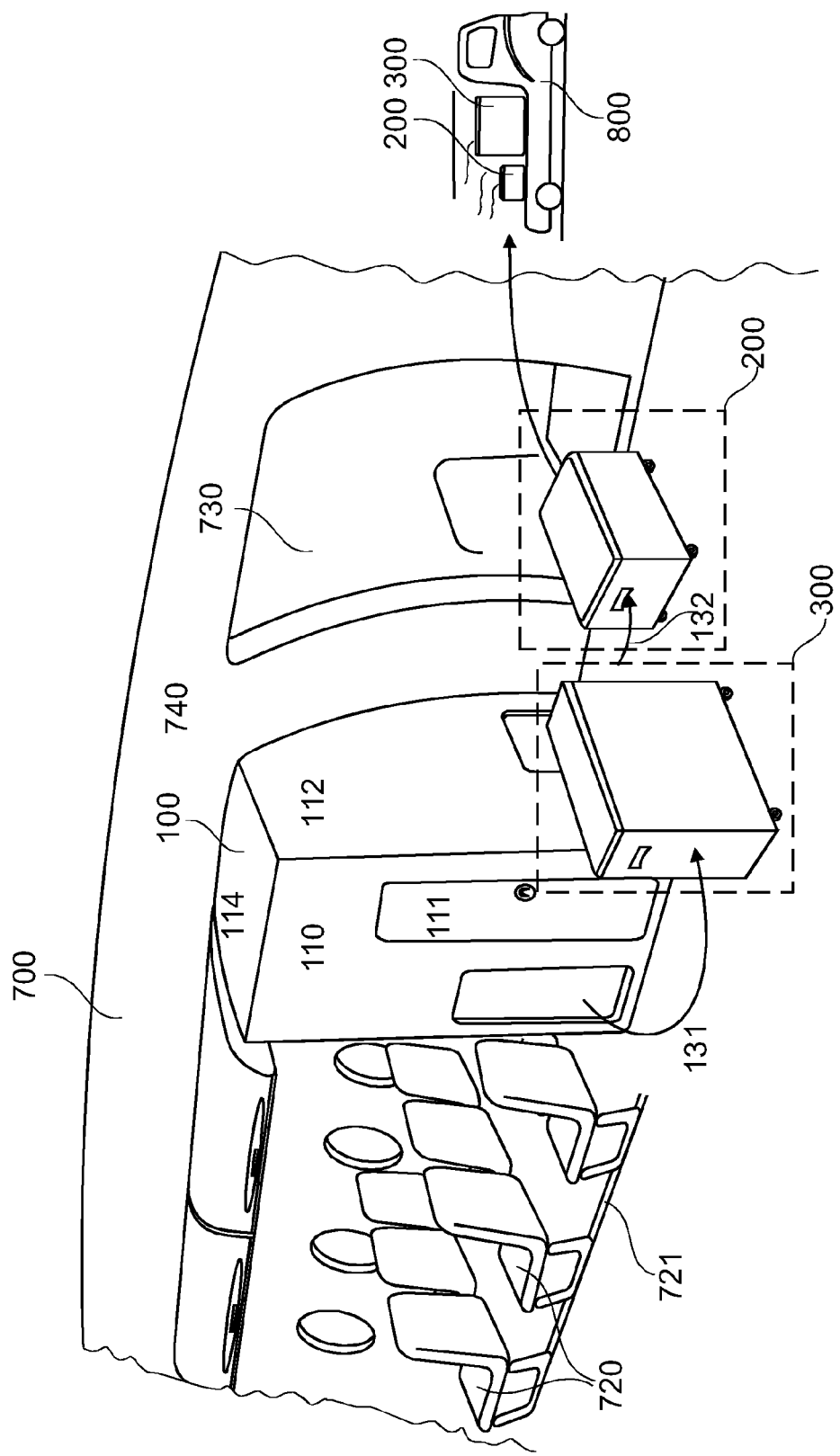
FIG. 2 is a lateral view of an on-board toilet monument during removal of two mobile sanitary units from an aircraft.

FIG. 2 shows a further three-dimensional lateral view of the toilet monument 100 arranged in an aircraft 700. This illustration shows removal of the mobile sanitary units. The arrows 131 and 132 show the removal and outward transport of the mobile wash facility 300 or of the mobile toilet unit 200. These two units may then be transported away, by a suitable transport vehicle 800, for cleaning, disinfection, service or repair.

Figure 3:
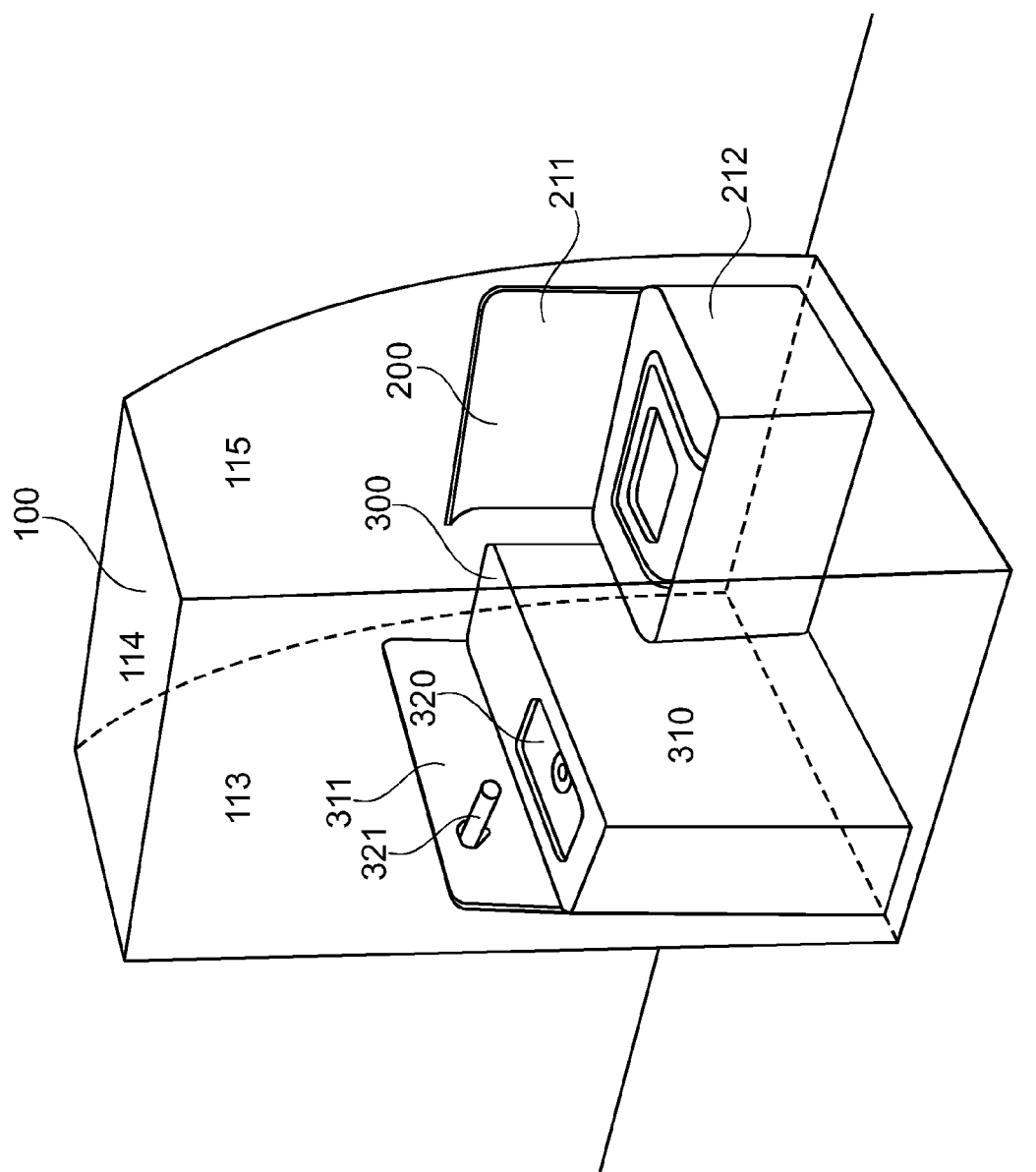
FIG. 3 is a detailed view of a toilet monument with a toilet unit and a mobile wash facility.

FIG. 3 shows a detailed view of the toilet monument 100, wherein the rear wall 115, the ceiling section 114 and the sidewall 113 facing the passenger seat rows are shown. The lateral surface 212 of the housing of the mobile toilet unit may be designed in such a manner that it finishes off flush with the plane of the fixed sidewall 112 of the toilet monument.

Also shown is the mobile hand wash facility 300 with a basin 320 and a housing 310 as well as a cover 311, which mobile hand wash facility 300 comprises a water inlet device 321. In a further embodiment of the wash-facility cover 311, the cover may be divided. The foldout cover beside the basin unit may serve as a pull-out or fold-out table.

Not shown in FIG. 3 are connecting devices for secured and function-coupled reception of the mobile sanitary units 200 and 300. Suitable connecting devices are, for example, spring-preloaded locking pins that may engage receptacles arranged in the toilet monument. The locking pins may then be undone for unlocking by control latches. Furthermore, the lock-down system may then indicate to the central aircraft communication system whether the mobile sanitary units 200 or 300 have been locked into place and functionally coupled.

Figure 4:
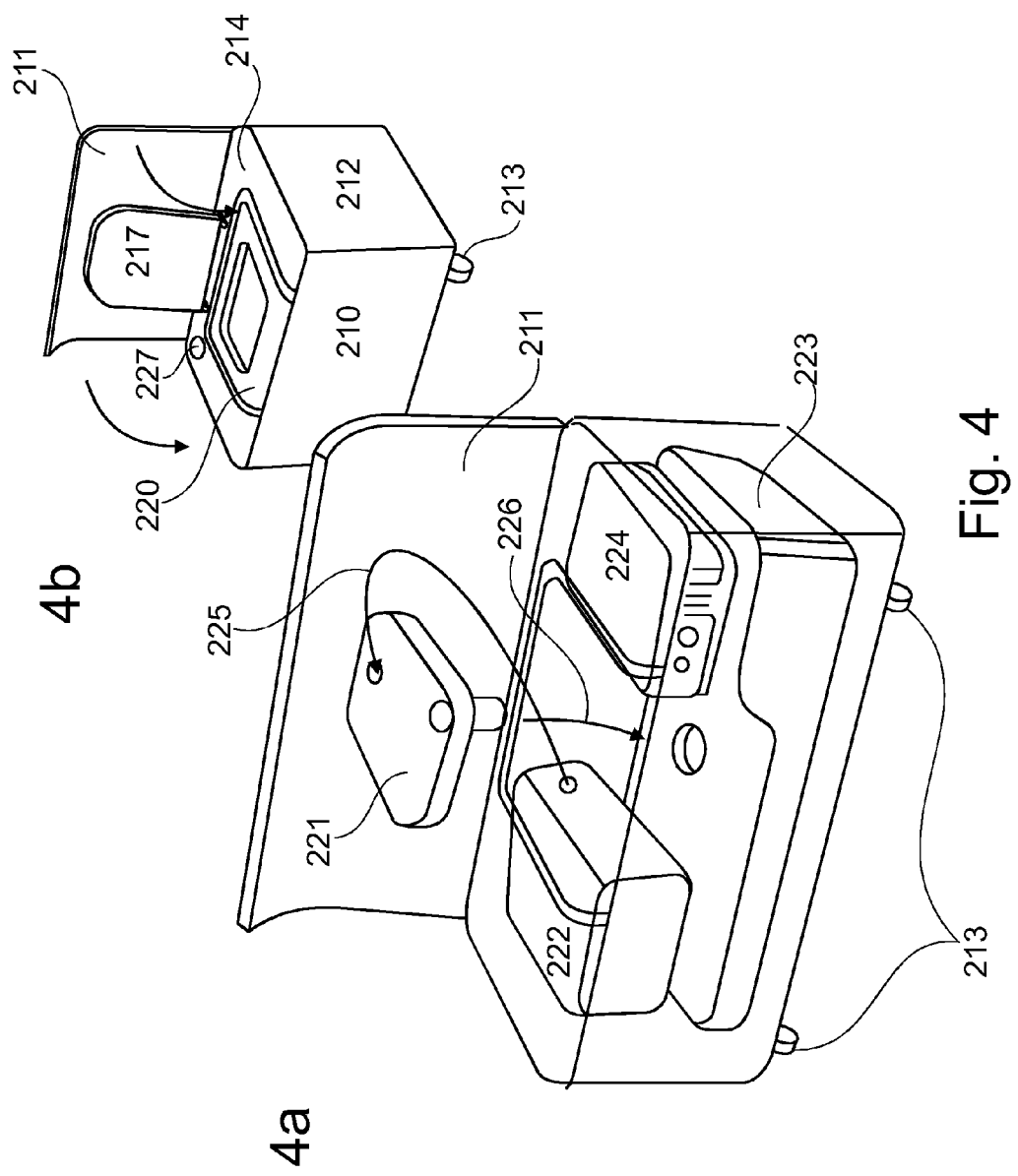
FIG. 4 is a detailed view of a mobile toilet unit with a flush-water tank.

FIG. 4 shows two three-dimensional views 4a and 4b of a toilet unit. An interior view of the housing is shown. FIG. 4a shows a flushing solution of the toilet unit; this means that a fresh-water tank or a flushing-solution tank 222 is provided which by a suitable connection 225 may supply the toilet bowl 221 with water for flushing. Arising waste water together with solid human waste may be collected in the collecting container 223. Furthermore, a container for receiving operating units 224 is shown. This container may comprise the electronics and the controller as well as further necessary electronic components of the mobile sanitary unit. Further components that are necessary for operating the mobile toilet unit, such as pumps, inlet pipes and outlet pipes, or valves, are not shown in FIG. 4a.

FIG. 4b shows the mobile toilet unit with a toilet seat cover 217 and a toilet seat 220. A toilet switch or flushing button 227 is shown as an example. However, other embodiments are also possible, for example flushing levers, rocker switches or foot pedals, which for operation may be folded out from the mobile sanitary unit. An odor-proof and waterproof closure option may be provided either by the toilet cover 211 or by the toilet lid 217 itself.

Not shown in FIG. 4a or FIG. 4b are facilities for receiving, for example, toilet paper or other hygiene products in the housing of the mobile sanitary unit. Furthermore, it is also possible to provide a receptacle for a waste container in the upper housing cover 214 or in the front sidewall 210.

Figure 5:
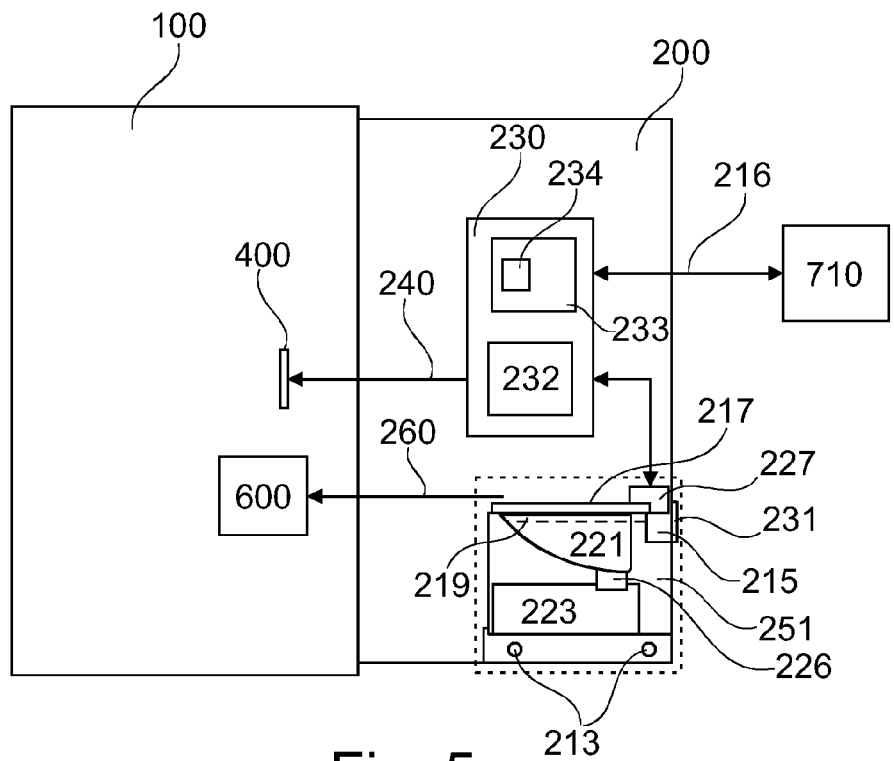
FIG. 5 is a diagrammatic drawing of a toilet monument comprising a mobile toilet unit with recirculation equipment and connections to central systems of an aircraft.

FIG. 5 shows a diagrammatic view of a further embodiment of the toilet monument 100. The toilet unit 200 may be inserted in a modular manner into the toilet monument 100. In the diagram the mobile sanitary unit is shown in the form of a waterless toilet unit indicated by a dashed square. In the case shown it is a recirculation-type toilet. It only comprises a collecting container 223, and the arising waste water may be fed to the flushing pipe 219 by way of the recirculation unit 251, which comprises filters, pumps and suitable valves. Flushing may be activated by the switch 227 and may be affected to flush the toilet bowl 221. The connecting pipe 226 connects the toilet bowl to the collecting container and comprises (not shown) an effective odor seal in the form of a valve or the like.

In a diagrammatic manner a sensor arrangement unit 215 is also shown, which comprises sensors such as fill-level measuring devices, which are, for example, positioned as floats in the collecting tank for the waste water or for solid human waste and may convey measured data to the electronics unit. Furthermore, the fill levels may be displayed by way of the display panel 231 that is visible from the outside. This facilitates service by personnel because as a result of a status display towards the outside, which status display is preferably independent of the electricity supply, there may be no mistaking between already cleaned units and units that still need to be cleaned.

For controlling the functions of the toilet unit, a control unit 230 is diagrammatically shown, which comprises a processor 233 with a storage unit 234, as well as an internal electricity supply 232, for example in the form of a capacitor. To safeguard against any failure of the internal electricity supply or for charging the aforesaid, a connection 240 to an external electricity supply 400 may be provided, which in the aircraft is used for all the electronics units. Furthermore, it is possible to implement a connection for communication with the central aircraft electronics. The interface 216 may, for example, be a wireless connection to the cabin communication system 710. In this manner it is possible in a simple way, by way of the forward attendant panel (FAP) 711, to indicate to aircraft personnel, for example, the fill levels of the mobile sanitary unit, or to notify said aircraft personnel about locking into place the mobile sanitary unit 200 in the toilet monument 100. The storage device may be used to provide an understanding of the operating cycles and service cycles over an extended period of time.

Since in the shown recirculation system it is possible for unpleasant odors to arise, it may make sense to arrange the air volumes arising in the toilet unit by a connection 260 to the central air extraction system of the aircraft 600. If the waterless toilet unit 200 is to be arranged without a central air exhaust system 600, an odor-sealing toilet lid 217 is possible, which may be closed off in an airtight manner with corresponding quick-action locking devices.

Figure 6:
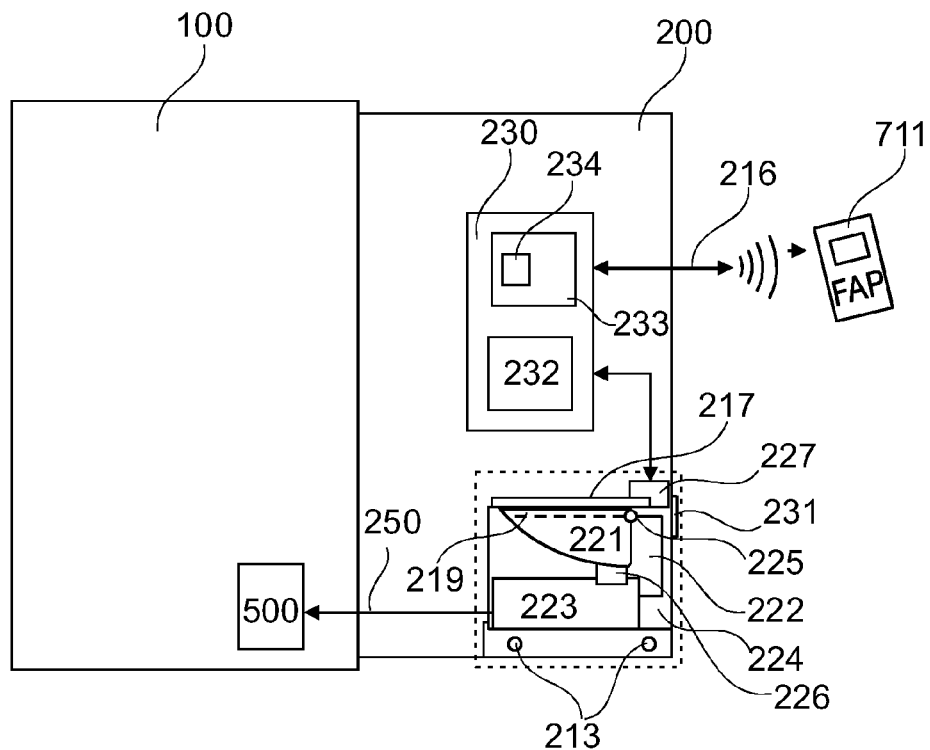
FIG. 6 is a diagrammatic drawing of a mobile toilet unit comprising a flush-water tank for integration in a toilet monument.

FIG. 6 shows a toilet monument 100 with a mobile sanitary unit 200 in the form of a flushing toilet unit that comprises a flush-water tank 222. As is the case in the preceding exemplary embodiment, this toilet unit comprises a waste-water tank 223 and a toilet seat 221 with a flushing pipe 219. The toilet bowl may comprise a cover 217. The toilet switch 227 is easily accessible to the user.

Furthermore, for receiving further components such as pumps, valves or the like, the receiving container 224 is provided, which also comprises the electronics unit. The electronics unit 200 is shown diagrammatically and, as is the case in FIG. 5, comprises a processor 230 with a storage device 234, as well as an internal electricity supply 232. Data communication may take place by way of wireless LAN via the interface 216. In this manner, by way of the forward attendant panel (FAP) 711, qualified personnel may easily be informed about the operational states of the mobile sanitary unit.

After removal of the mobile toilet unit from the toilet monument 100, qualified personnel may check the operational state of the toilet unit by way of the display 231, which is visible from the outside. By way of the rollers 213 the mobile sanitary unit may be removed in a simple manner during the standard turnaround. Exchanging this unit is thus very uncomplicated, and the movable box may be transported onward for cleaning.

For this flush-water tank solution a negative pressure system is provided. The water storage tank 222 provides the water required for flushing. In the absence of water the toilet unit is rendered inoperative. Corresponding information is conveyed to the central communication system of the aircraft, and locking of the toilet door is arranged (e.g., by notifying the cabin crew). Suitable valves prevent the water reservoir from being discharged, or prevent any return flow from the waste-water container to the toilet bowl. By a flushing pump (not shown) the water may be injected under pressure into the toilet bowl by way of the flushing pipe 219. The flushing pipe is arranged around the toilet bowl so as to ensure effective cleaning of the toilet bowl 221. Furthermore, the duration of flushing the toilet may be varied by way of the switch 227. In this manner it is also possible to implement customer wishes relating to the duration of flushing and to frugal use of water.

A vacuum motor arranged in the collecting container 224 ensures the build-up of negative pressure in the waste-water collection tank 223. The vacuum motor may, for example, only be activated if the door 111 of the first opening 101 is locked. After activation of the flushing button 227, the corresponding valve in the connecting pipe 226 may be opened, and the waste water may be removed by suction from the toilet bowl and may be conveyed to the collecting tank 223 for solid human waste. It is also possible for a connection to the central extraction system 600, not shown in this figure, to be arranged in order to ensure extraction of the toilet cabin air. Furthermore, smoke detectors (not shown) prescribed for use in aircraft are installed in the toilet unit. Should any smoke be detected, this may be centrally reported to the cabin communication system.

For the flush-water solution of the toilet unit a connecting line 250 to the central waste-water system 500 may be installed. Conveying the waste water to the central drain mast, would, however, require prior treatment by way of filters or similar. Since central water treatment systems are not commonly encountered in passenger transport vehicles, decentralized disinfection and disposal of waste water or quantities of black water are possible. The controller 230 may monitor the fill levels of the mobile sanitary unit, and if the maximum fill level has been reached, central waste-water disposal by way of the central waste-water system 500 may be necessary.

It should be noted that the term "comprising" does not exclude other elements or method-related steps, and that the term "a" or "an" does not exclude a plural number of elements or steps. The reference characters used are stated purely to provide a better understanding; they should in no way be interpreted as limiting, with the scope of protection defined by the claims. Moreover, while at least one embodiment has been presented in the foregoing summary and detailed description of the invention, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. A toilet monument comprising:
    a mobile sanitary unit;
    a receptacle configured to receive the mobile sanitary unit;
    a first opening configured such that a person may enter the toilet monument through the first opening, the first opening defined through a first wall of the toilet monument, the first wall of the toilet monument removably fixed to a cabin of an aircraft; and
    a second opening that differs from the first opening for putting the mobile sanitary unit into place and for completely removing the mobile sanitary unit, the second opening defined through a second wall of the toilet monument, the second wall different than the first wall, and the second wall of the toilet monument removably fixed to the cabin of the aircraft,
    wherein the mobile sanitary unit comprises components for operation of the mobile sanitary unit.

2. The toilet monument of claim 1, wherein the mobile sanitary unit comprises a housing with an odor-sealing cover.

3. The toilet monument of claim 1, wherein the mobile sanitary unit comprises a housing with a liquid-sealing cover.

4. The toilet monument of claim 1, wherein the mobile sanitary unit comprises a rolling device.

5. The toilet monument of claim 1, wherein the mobile sanitary unit comprises a sliding device.

6. The toilet monument of claim 1, wherein the mobile sanitary unit comprises a sidewall that closes off the second opening of the toilet monument when the mobile sanitary unit is in place in the receptacle.

7. The toilet monument of claim 1, comprising a connecting device configured to secure and function-coupling connection of the mobile sanitary unit in the receptacle.

8. The toilet monument of claim 1,
    wherein the mobile sanitary unit comprises an interface to an external electricity supply configured to supply electricity, and
    wherein the electricity is transmitted inductively.

9. The toilet monument of claim 1,
    wherein the mobile sanitary unit comprises a sensor arrangement configured to generate measured data, and
    wherein the measured data is transmitted with a wireless interface.

10. The toilet monument of claim 1, wherein the mobile sanitary unit comprises a connection that is configured to connect a central waste-water system.

11. The toilet monument of claim 1, wherein a cover of the mobile sanitary unit is a roller cover.

12. The toilet monument of claim 1,
    wherein the mobile sanitary unit comprises a toilet unit, and
    wherein the toilet unit comprises:
        a toilet bowl;
        a collecting container that is configured for solid human waste and waste water; and
        a container that is configured to receive operating units.

13. The toilet monument of claim 12, wherein the mobile sanitary unit comprises a connection device that is configured to connect to a central air-extraction system.

14. The toilet monument of claim 1, wherein the toilet monument comprises a third opening defined through the first wall of the toilet monument that differs from the first opening and the second opening, the third opening is configured to receive a further mobile sanitary unit in a form of a hand wash facility.

15. The toilet monument of claim 1, wherein the toilet monument comprises a third opening defined through the first wall of the toilet monument that differs from the first opening and the second opening, the third opening is configured to receive a further mobile sanitary unit in a form of a shower unit.

16. The toilet monument of claim 1, wherein the toilet monument comprises a third opening defined through the first wall of the toilet monument that differs from the first opening and the second opening, the third opening is configured to receive a further mobile sanitary unit in a form of a urinal with a flush-water tank.

* * * * *